United States Patent
Lee et al.

(10) Patent No.: US 8,233,263 B2
(45) Date of Patent: Jul. 31, 2012

(54) MULTILAYER CHIP CAPACITOR FOR IMPROVING ESR AND ESL

(75) Inventors: Byoung Hwa Lee, Gyunggi-do (KR); Sung Kwon Wi, Seoul (KR); Hae Suk Chung, Seoul (KR); Dong Seok Park, Seoul (KR); Sang Soo Park, Gyunggi-do (KR); Min Cheol Park, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 556 days.

(21) Appl. No.: 12/248,476

(22) Filed: Oct. 9, 2008

(65) Prior Publication Data

US 2009/0225492 A1    Sep. 10, 2009

(30) Foreign Application Priority Data

Mar. 7, 2008   (KR) .................. 10-2008-0021310

(51) Int. Cl.
*H01G 4/005* (2006.01)
*H01G 4/06* (2006.01)
*H01G 4/228* (2006.01)

(52) U.S. Cl. ............... 361/303; 361/321.2; 361/306.3

(58) Field of Classification Search ............ 361/306.3, 361/306.2, 306.1, 303, 321.2, 321.3, 329, 361/328, 330
See application file for complete search history.

(56) References Cited

U.S. PATENT DOCUMENTS

| | | |
|---|---|---|
| 5,880,925 A | 3/1999 | DuPre et al. |
| 6,441,459 B1 | 8/2002 | Togashi et al. |
| 7,310,217 B2 * | 12/2007 | Takashima et al. ........ 361/306.3 |
| 7,394,645 B2 * | 7/2008 | Takahashi ................... 361/303 |
| 7,411,776 B2 * | 8/2008 | Aoki ........................... 361/306.3 |
| 7,428,135 B2 * | 9/2008 | Togashi et al. .............. 361/303 |
| 7,436,648 B2 * | 10/2008 | Togashi ....................... 361/303 |
| 2005/0190529 A1 | 9/2005 | Togashi |

FOREIGN PATENT DOCUMENTS

| | | |
|---|---|---|
| JP | 2002-164248 | 6/2002 |
| JP | 2006-203168 | 8/2006 |
| JP | 2007-123505 | 5/2007 |
| JP | 2007-173838 | 7/2007 |
| JP | 2007-201467 | 8/2007 |
| JP | 2007-317786 | 12/2007 |
| KR | 10-2006-0041626 A | 5/2006 |

OTHER PUBLICATIONS

Japanese Office Action, w/ English translation thereof, issued in Japanese Patent Application No. JP 2008-268629 dated Apr. 19, 2011.
Japanese Office Action, w/ English translation thereof, issued in Japanese Patent Application No. 2008-268629, dated Oct. 11, 2011.

* cited by examiner

*Primary Examiner* — Eric Thomas
*Assistant Examiner* — David M Sinclair
(74) *Attorney, Agent, or Firm* — McDermott Will & Emery LLP

(57) ABSTRACT

A multilayer chip capacitor includes a capacitor body including a stack of a plurality of dielectric layers and having first and second side faces and first and second end faces, a plurality of external electrodes of opposite polarity alternated on each of the first and second side faces, and a plurality of internal electrodes each including one or two leads extending to an outer face of the capacitor body and respectively connected to the external electrodes. A horizontal distance between leads of the internal electrodes of opposite polarity adjacent to each other in a stack direction is longer than a pitch between the external electrodes of opposite polarity adjacent to each other on the same side face of the capacitor body.

20 Claims, 14 Drawing Sheets

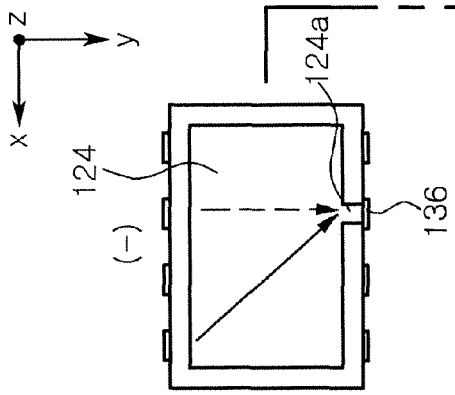
FIG. 2A
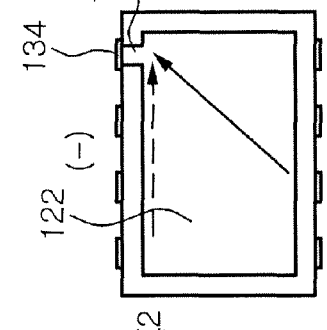
FIG. 2B
FIG. 2C
FIG. 2D
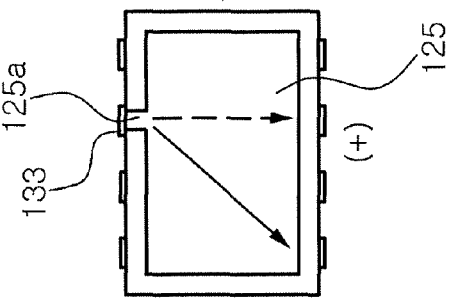
FIG. 2E
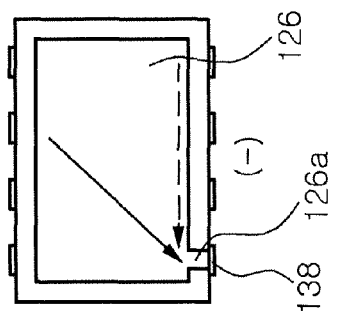
FIG. 2F
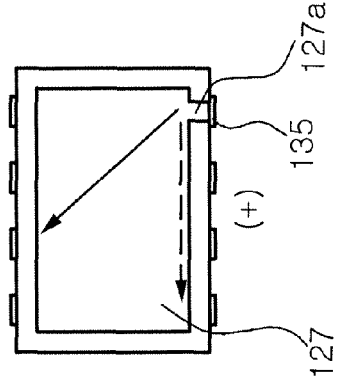
FIG. 2G
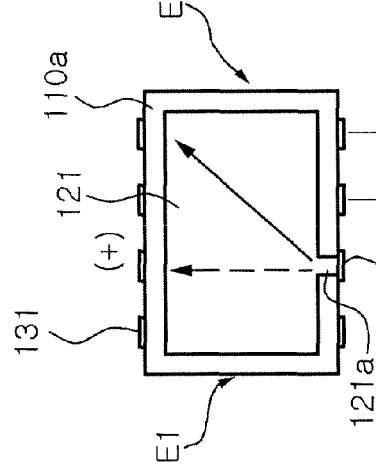
FIG. 2H
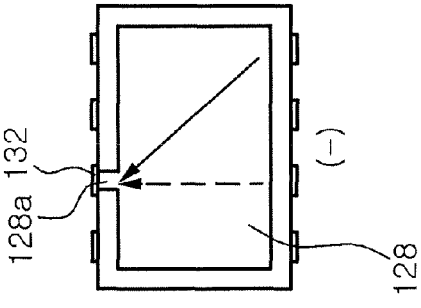

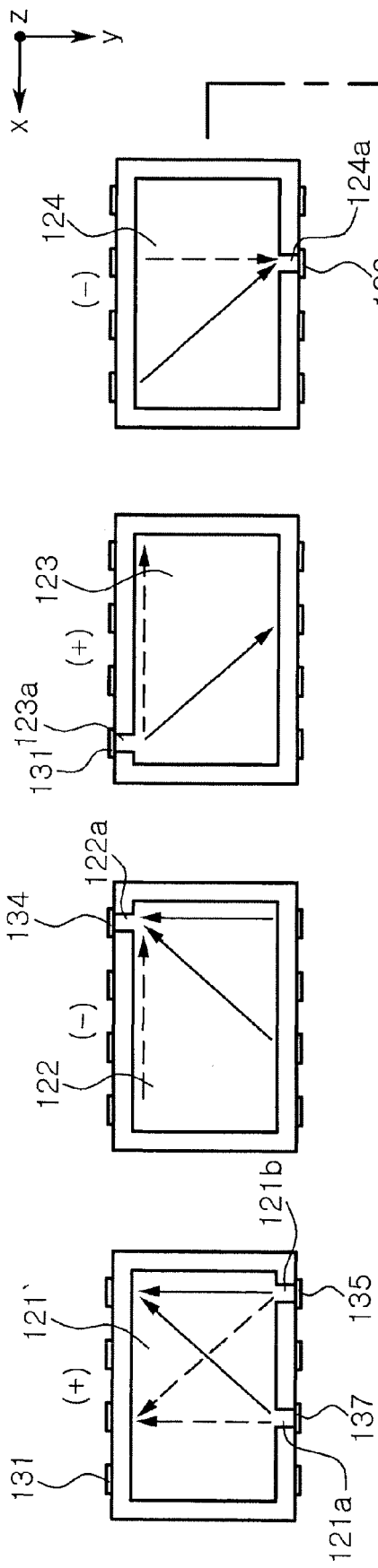
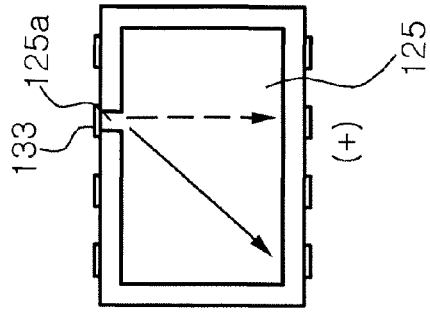
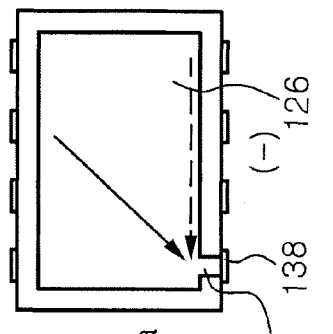
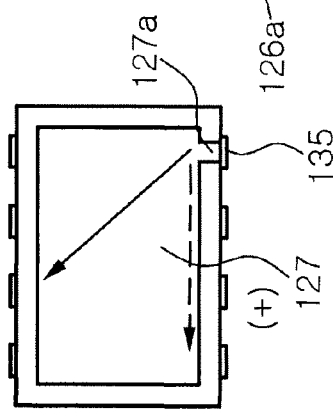
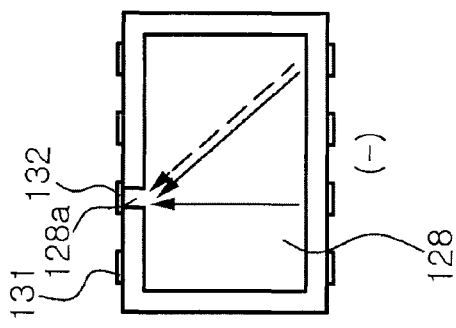

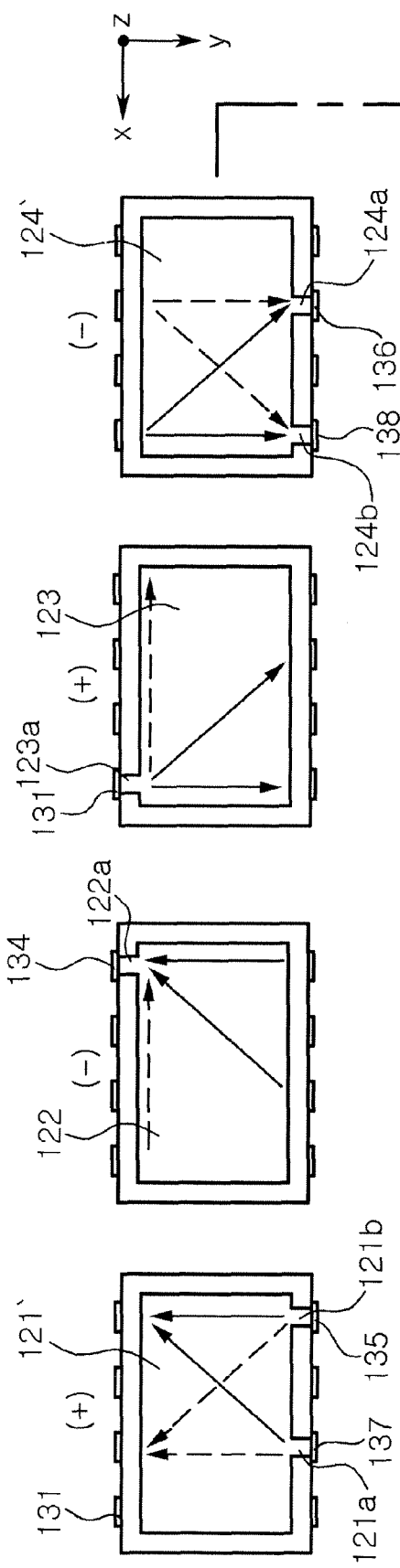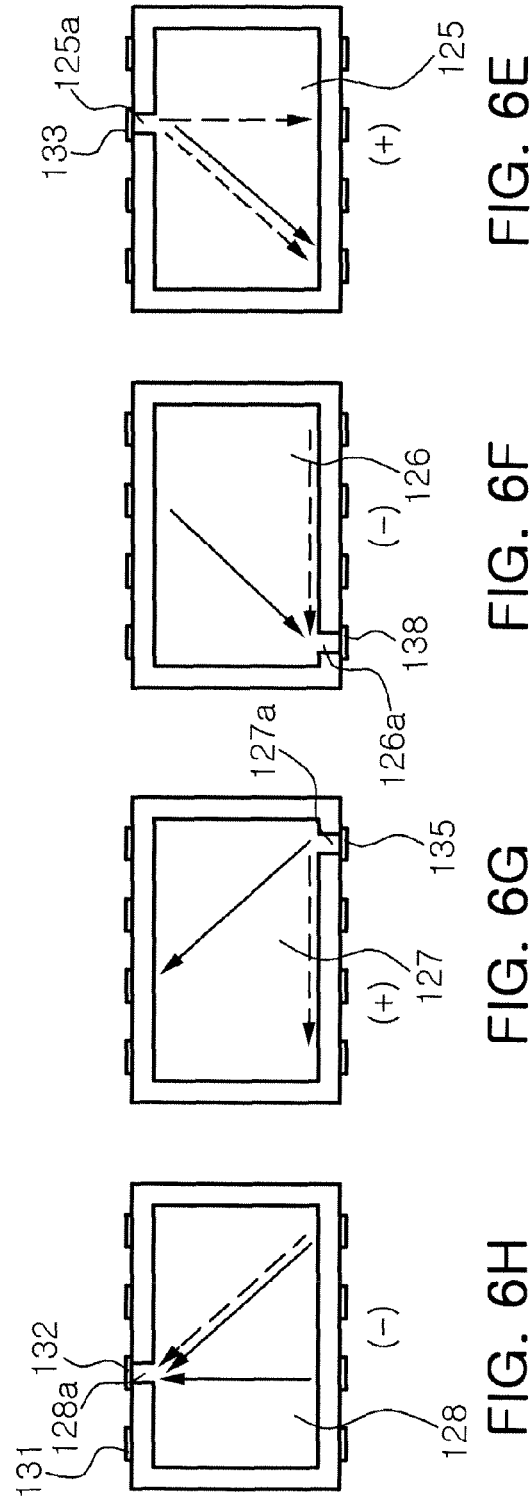

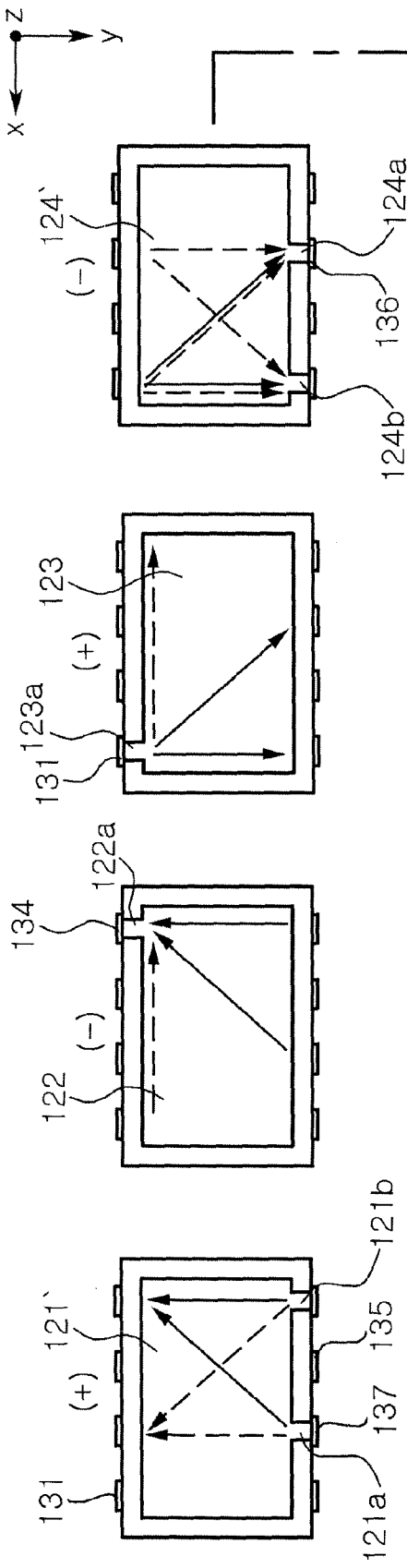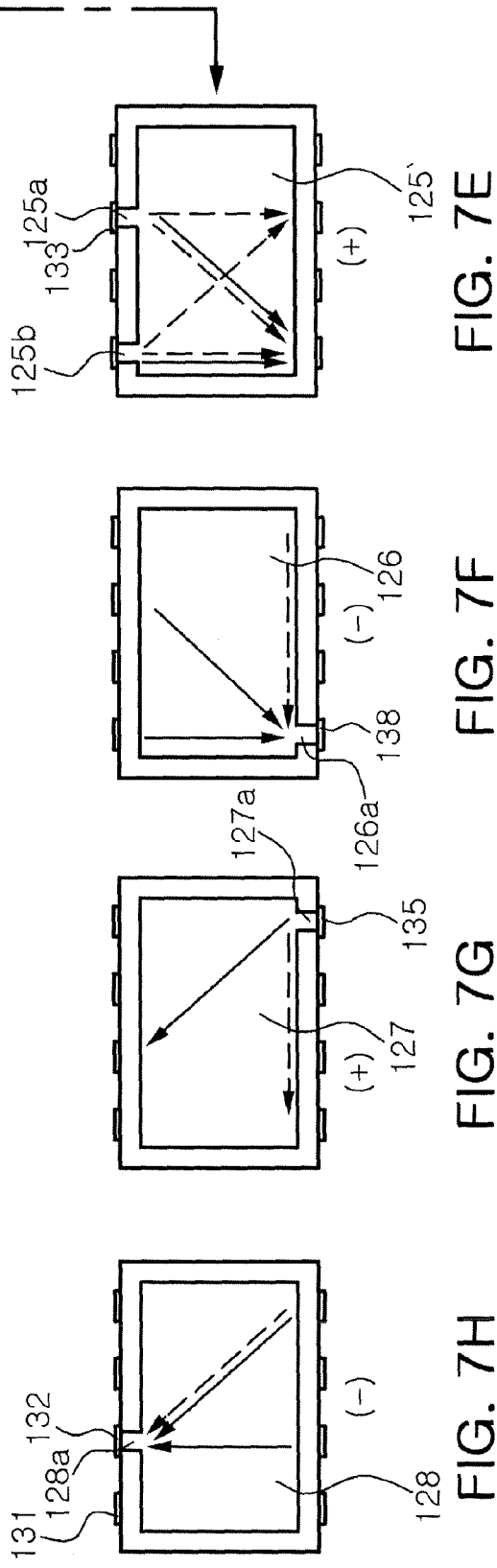

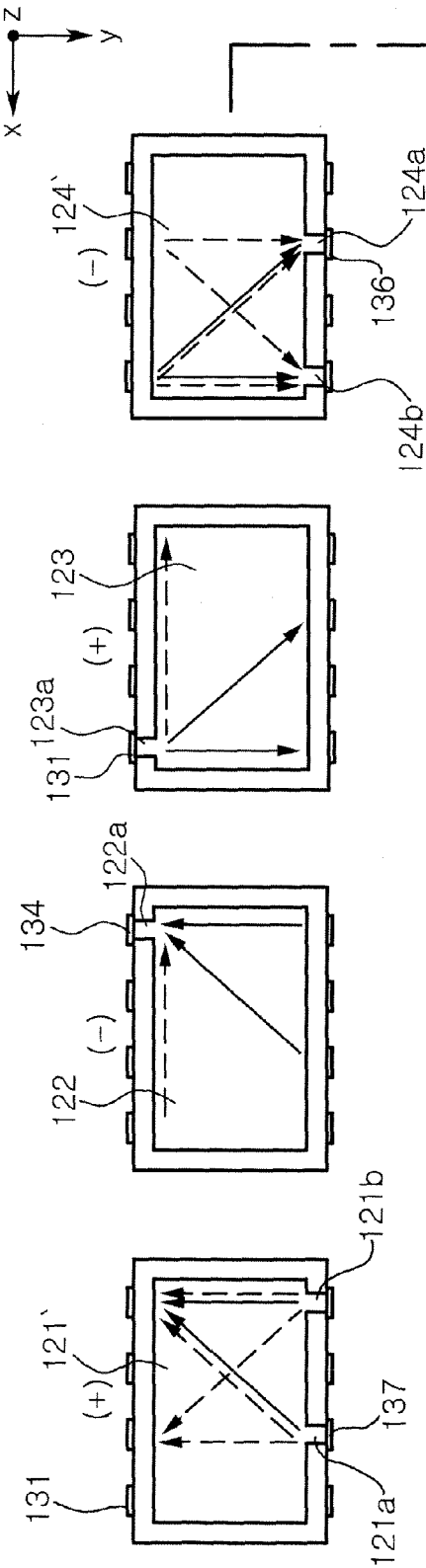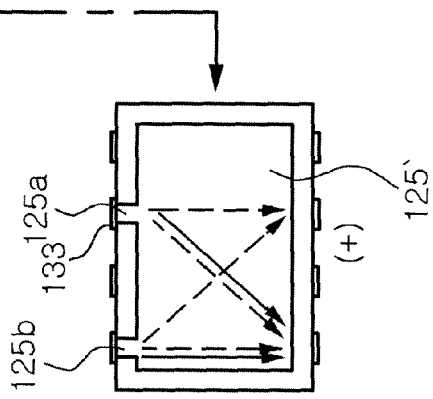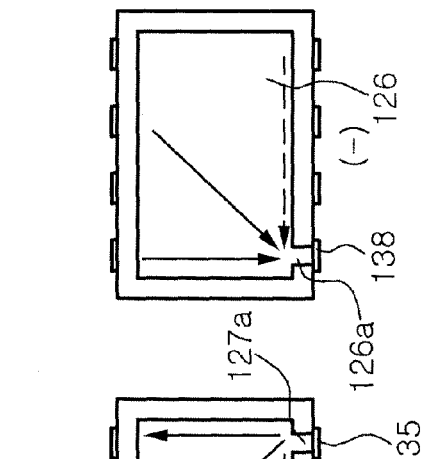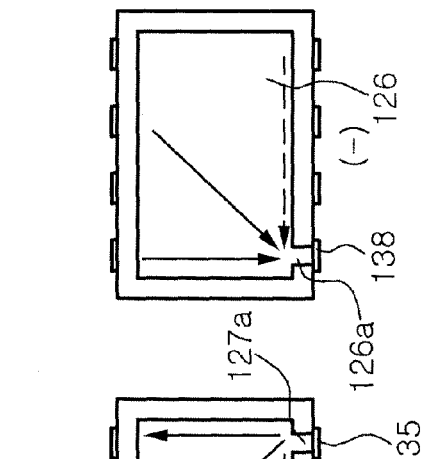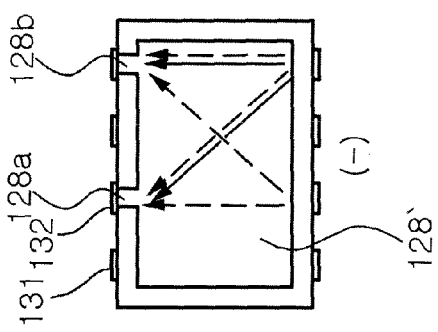

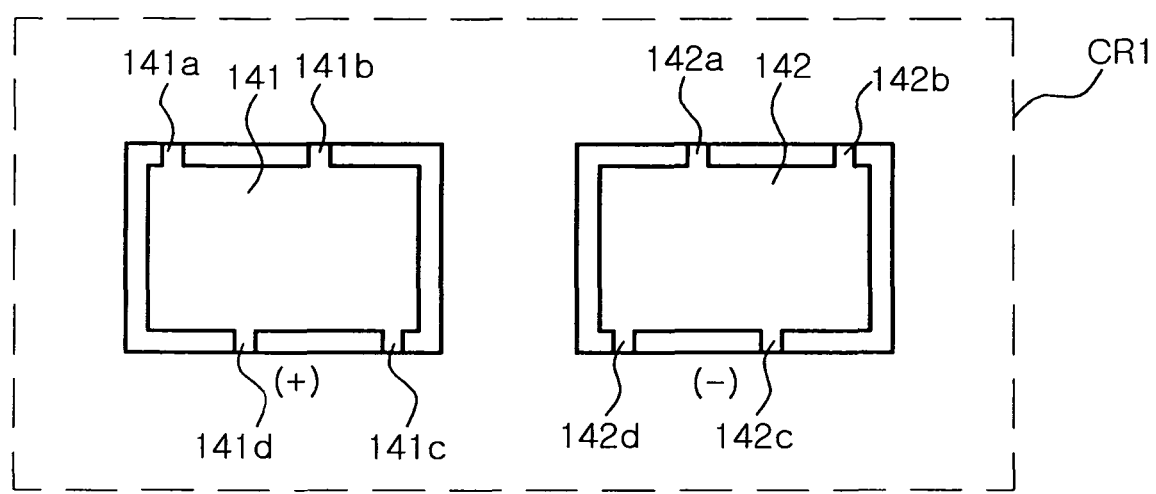
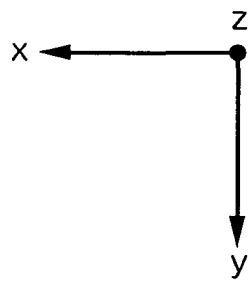
FIG. 10

MULTILAYER CHIP CAPACITOR FOR IMPROVING ESR AND ESL

CROSS-REFERENCE TO RELATED APPLICATIONS

This application claims the priority of Korean Patent Application No. 2008-0021310 filed on Mar. 7, 2008, in the Korean Intellectual Property Office, the disclosure of which is incorporated herein by reference.

BACKGROUND OF THE INVENTION

1. Field of the Invention

The present invention relates to a multilayer chip capacitor, and more particularly, to a multi-terminal multilayer chip capacitor which can efficiently increase equivalent series resistance (ESR) while minimizing an increase in equivalent series inductance (ESL), and is suitable to be used as a decoupling capacitor of a power distribution network of a micro processor unit (MPU).

2. Description of the Related Art

An operating frequency for a high-speed micro processor unit (MPU) is continuously increasing, leading to an increase in current consumption, and an operating voltage for an MPU chip is being lowered. Thus, it becomes more difficult to suppress noise of a DC supply voltage, which occurs due to a sudden fluctuation of a load current of the MPU below a certain level, generally, 5~10%. A multilayer chip capacitor is being widely used in a power distribution network to remove the voltage noise. The multilayer chip capacitor for decoupling removes voltage noise by supplying a current to a central processing unit (CPU) at the time of the sudden fluctuation of the load current.

The load current fluctuates even more rapidly with the further increase in operating frequency of the MPU. Therefore, a decoupling capacitor is required to have higher capacitance, higher equivalent series resistance (ESR) and lower equivalent series inductance (ESL), so that the magnitude of an impedance of the power distribution network can be maintained at a low and constant level within a broad frequency band. This can ultimately contribute to suppressing the voltage noise caused by the sudden fluctuation of the load current.

In order to achieve low ESL, U.S. Pat. No. 5,880,925 discloses a multilayer capacitor in which external electrodes of positive (+) polarity are alternated with external electrodes of negative (−) polarity on both side faces of a capacitor body, and leads of first and second internal electrodes of opposite polarity are disposed adjacent to each other in an interdigitated arrangement. Accordingly, fluxes caused by high-frequency current flowing in the internal electrodes cancel each other, thereby reducing parasitic inductance of the capacitor. However, the internal electrodes each having four or more leads result in excessively low ESR, which causes a power circuit to be unstable.

U.S. Pat. No. 6,441,459 discloses a method of using only one lead at each internal electrode. Since only one lead is used for each internal electrode, a power circuit is prevented from being unstable due to the excessively low ESR. However, there is a limit in increasing the ESR, using such a small number of leads. For example, in a capacitor proposed by U.S. Pat. No. 6,441,459, leads of internal electrodes adjacent in a stack direction remain in close proximity and thus a current path at the internal electrodes becomes short, which limits the increase in ESR.

SUMMARY OF THE INVENTION

An aspect of the present invention provides a multi-terminal, multilayer chip capacitor which can efficiently increase ESR while minimizing an increase of ESL.

According to an aspect of the present invention, there is provided a multilayer chip capacitor including: a capacitor body including a stack of a plurality of dielectric layers and having first and second side faces facing each other and first and second end faces facing each other; a plurality of external electrodes each extending in a stack direction of the dielectric layers, the external electrodes of opposite polarity being alternated on each of the first and second side faces; and a plurality of internal electrodes each comprising one or two leads extending to an outer face of the capacitor body and respectively connected to the external electrodes, the internal electrodes of opposite polarity being alternated to face each other, with the dielectric layer located between each facing set of the internal electrodes. A horizontal distance between leads of the internal electrodes of opposite polarity located adjacent to each other in the stack direction is longer than a pitch between the external electrodes of opposite polarity located adjacent to each other on the same side face of the capacitor body.

A current may flow in the internal electrodes in directions opposite or perpendicular to each other with respect to at least one of a long side direction and a short side direction of the internal electrode.

The multilayer chip capacitor may be an 8-terminal capacitor, and the plurality of external electrodes may include first to eighth external electrodes, the first to fourth external electrodes being sequentially disposed on the first side face from the first end face toward the second end face, and the fifth to eighth external electrodes being sequentially disposed on the second side face from the second end face toward the first end face.

The internal electrodes may include first to eighth internal electrodes sequentially and consecutively disposed in the stack direction, the first to eight internal electrodes forming one or more blocks being stacked.

The first to eighth internal electrodes may each include one or two leads extending to one of the first side face and the second side face.

The first internal electrode may include a lead connected to the seventh external electrode, the second internal electrode may include a lead connected to the fourth external electrode, the third internal electrode may include a lead connected to the first external electrode, the fourth internal electrode may include a lead connected to the sixth external electrode, the fifth internal electrode may include a lead connected to the third external electrode, the sixth internal electrode may include a lead connected to the eighth external electrode, the seventh internal electrode may include a lead connected to the fifth external electrode, and the eighth internal electrode may include a lead connected to the second external electrode.

The first internal electrode may further include a lead connected to the fifth external electrode. The fourth internal electrode may further include a lead connected to the eighth external electrode. The fifth internal electrode may further include a lead connected to the first external electrode. The eighth internal electrode may further include a lead connected to the fourth external electrode.

The capacitor body may include a first capacitor part and a second capacitor part arranged in the stack direction, and the second capacitor part may include the plurality of internal electrodes, and the first capacitor part may include a plurality of additional internal electrodes of opposite polarity alternated in the capacitor body to face each other, with the dielectric layer located between each facing set of the additional internal electrodes. In the first capacitor part, the plurality of additional internal electrodes may each include at least one lead extending to the first or second side face. The shortest horizontal distance between respective leads extending to the same side face of the additional internal electrodes of opposite polarity located adjacent to each other in the stack direction may be equal to a pitch between the external electrodes of opposite polarity located adjacent to each other on the same side face.

In the first capacitor part, the leads of the internal electrodes of opposite polarity located vertically adjacent to each other may be adjacent to each other at all times.

The first capacitor part may be disposed at a lower end in the capacitor body, and the second capacitor part may be disposed on the first capacitor part.

The first capacitor part may be disposed at each of upper and lower ends in the capacitor body, and the second capacitor part may be disposed between the first capacitor part at the upper end and the first capacitor part at the lower end.

The first capacitor part at the upper end may be symmetrical to the first capacitor part at the lower end, and thus upper and lower portions of the multilayer chip capacitor may be symmetrical to each other.

Equivalent series resistance (ESR) per layer provided by one facing set of the internal electrodes in the second capacitor part may be higher than ESR per layer provided by one facing set of the additional internal electrodes in the first capacitor part. Equivalent series inductance (ESL) per layer provided by one facing set of the additional internal electrodes in the first capacitor part may be lower than ESL per layer provided by one facing set of the internal electrodes in the second capacitor part.

The plurality of internal electrodes in the second capacitor may include first to fourth internal electrodes sequentially and consecutively stacked, and the first to fourth internal electrodes may each include one lead, and a lead of the first internal electrode may be connected to an external electrode closest to the second end face among the external electrodes disposed on the first side face, a lead of the second internal electrode may be connected to an external electrode closest to the first end face among the external electrodes disposed on the first side face, a lead of the third internal electrode may be connected to an external electrode closest to the first end face among the external electrodes disposed on the second side face, and a lead of the fourth internal electrode may be connected to an external electrode closest to the second end face among the external electrodes disposed on the second side face.

The plurality of additional internal electrodes in the first capacitor part may include additional internal electrodes of first polarity and additional internal electrodes of second polarity alternated to face each other, each of the additional internal electrodes may include at least two leads, and leads of the additional internal electrode of the first polarity may be interdigitated with leads of the additional internal electrode of second polarity adjacent to each other, the leads being connected to the external electrodes of corresponding polarity.

The plurality of additional internal electrodes in the first capacitor part may include additional internal electrodes of first polarity and additional internal electrodes of second polarity alternated with each other to face each other, and each of the additional internal electrodes may include only one lead connected to the external electrode. In the first capacitor part, respective leads extending to the same side face of the additional internal electrodes located adjacent to each other in the stack direction may be connected to the external electrodes located adjacent to each other on the same side face.

The plurality of additional internal electrodes in the first capacitor part may include additional internal electrodes of first polarity and additional internal electrodes of second polarity alternated with each other to face each other, and each of the additional internal electrodes may include two leads respectively extending to the first side face and the second side face and connected to the external electrodes. In each of the additional internal electrodes in the first capacitor part, the lead extending to the first side face is offset by one external electrode position in relation to the lead extending to the second side face, and the leads of the plurality of additional internal electrodes in the first capacitor part may be disposed in zigzag form along the stack direction from the view of each of the first side face and the second side face.

BRIEF DESCRIPTION OF THE DRAWINGS

The above and other aspects, features and other advantages of the present invention will be more clearly understood from the following detailed description taken in conjunction with the accompanying drawings, in which:

FIGS. 2A through 2H are cross-sectional views taken along line a plane perpendicular to a z-axis, illustrating internal electrode structures of the multilayer chip capacitor of FIG. 1;

FIGS. 5A through 5H are cross-sectional views of an internal electrode structure of a multilayer chip capacitor according to another exemplary embodiment of the present invention;

FIGS. 6A through 6H are cross-sectional views of an internal electrode structure of a multilayer chip capacitor according to still another exemplary embodiment of the present invention;

FIGS. 7A through 7H are cross-sectional views of an internal electrode structure of a multilayer chip capacitor according to yet another exemplary embodiment of the present invention;

FIGS. 8A through 8H are cross-sectional views of an internal electrode structure of a multilayer chip capacitor according to a further exemplary embodiment of the present invention;

FIG. 10 is a cross-sectional view of an internal electrode structure of a first capacitor part of FIG. 9;

DETAILED DESCRIPTION OF THE PREFERRED EMBODIMENT

Figure 1:
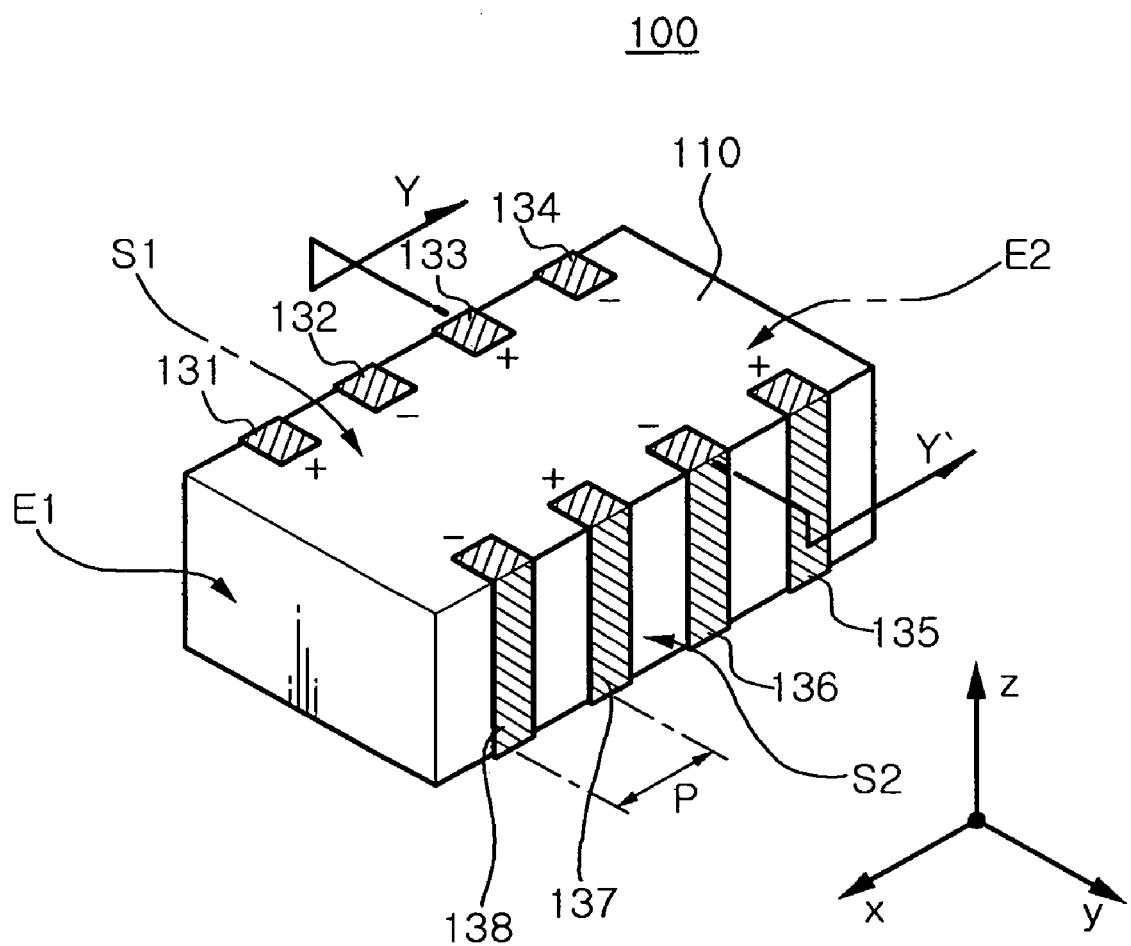
FIG. 1 is a perspective view of an exterior of a multilayer chip capacitor according to an exemplary embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Like reference numerals refer to like elements throughout.

Figure 3:
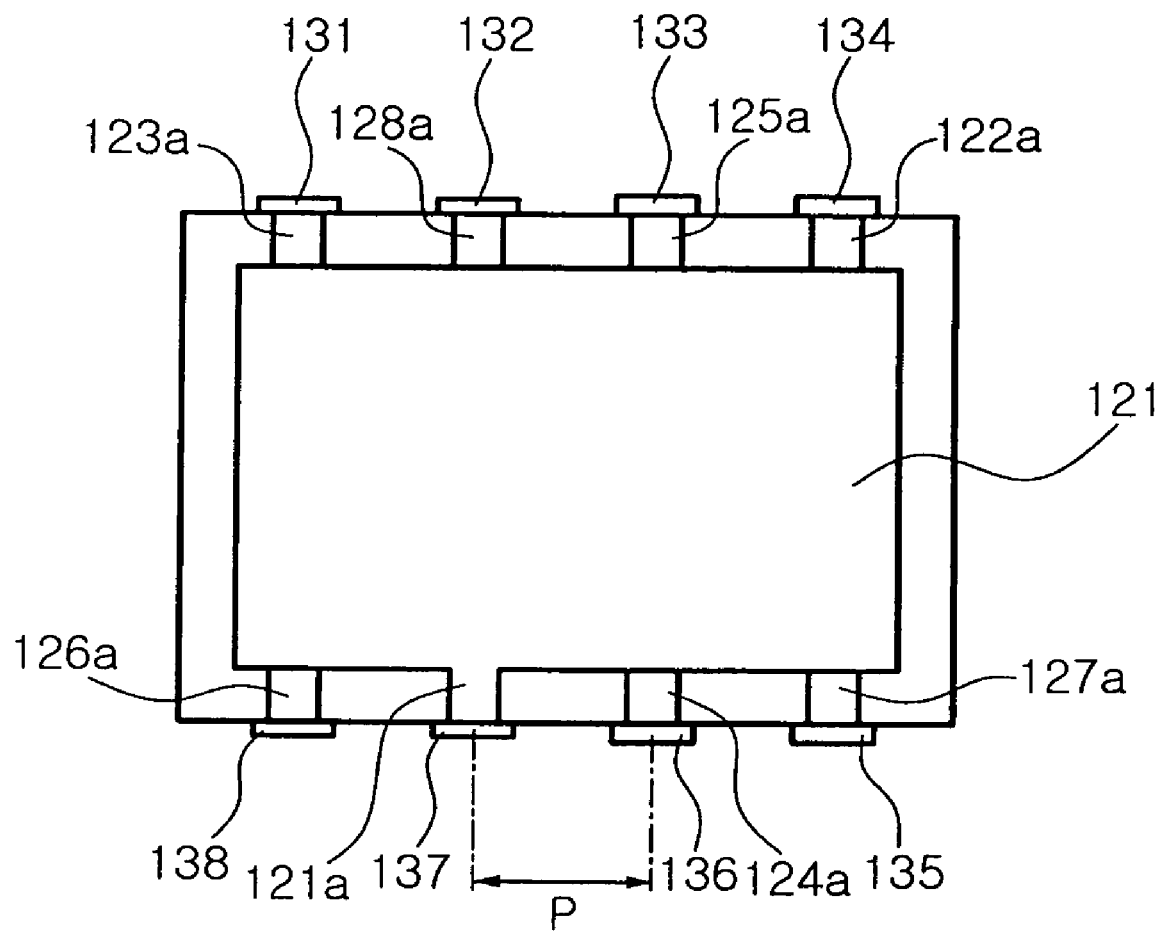
FIG. 3 is a plan view illustrating lead disposition of the multilayer chip capacitor of FIG. 1.
Figure 4:
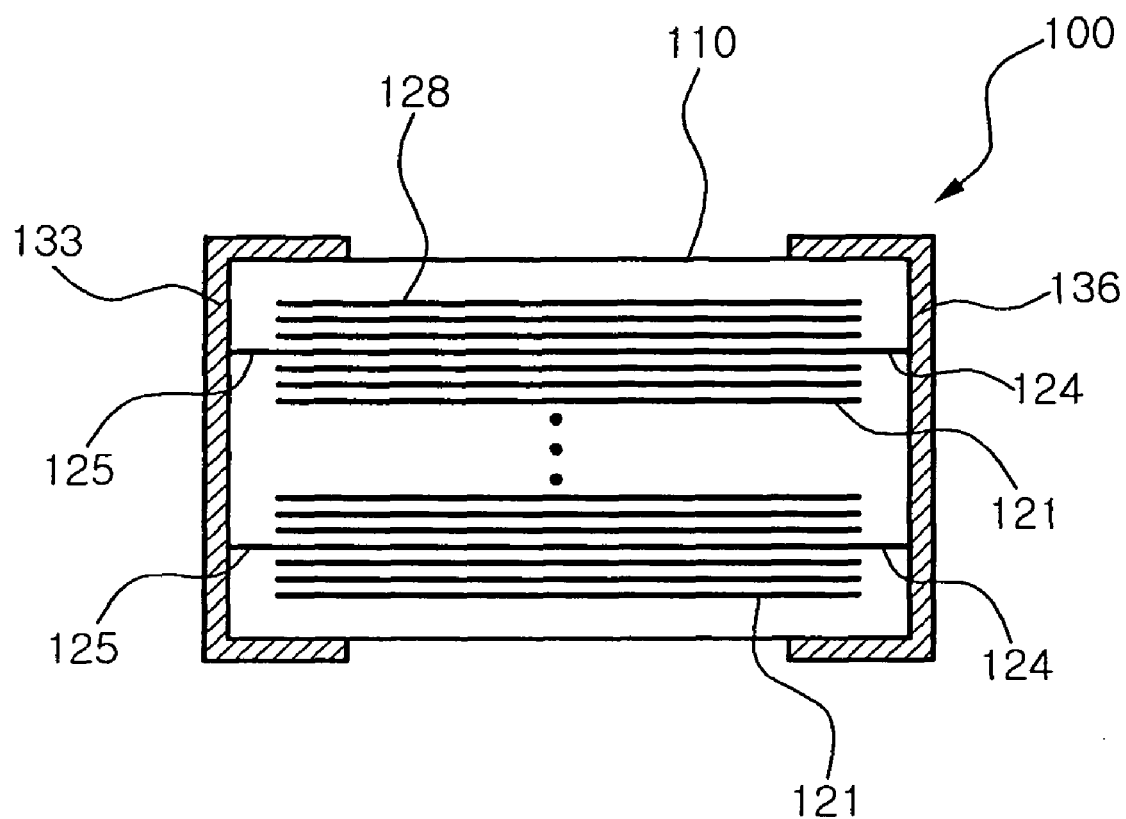
FIG. 4 is a sectional view taken along line Y-Y' of the multilayer chip capacitor of FIG. 1.

FIG. 1 is a perspective view of an exterior of a multilayer chip capacitor according to an exemplary embodiment of the present invention. FIGS. 2A through 2H are cross-sectional views taken along a plane perpendicular to a z-axis, illustrating internal electrode structures of the multilayer chip capacitor of FIG. 1. FIG. 3 is a plan view illustrating lead disposition of the multilayer chip capacitor of FIG. 1. FIG. 4 is a sectional view taken along line Y-Y' of the multilayer chip capacitor of FIG. 1.

Referring to FIG. 1, a multilayer chip capacitor 100 includes a capacitor body 110 having a rectangular parallelepiped shape including a first side face S1 and a second side face S2 facing each other, and a first end face E1 and a second end face E2 facing each other. The capacitor body 110 has a stack of a plurality of dielectric layers (see 110a of FIG. 2A) parallel to top and bottom faces.

A plurality of external electrodes 131, 132, 133, 134, 135, 136, 137 and 138 (hereinafter, also referred to as first to eighth external electrodes) are disposed on the first and second side faces S1 and S2 of the capacitor body 110, and extend in a stack direction (i.e., a z-axis direction). As shown in FIG. 1, the external electrodes 131 to 138 of opposite polarity are alternately disposed on the first and second side faces S1 and S2. In detail, the first to fourth external electrodes 131 to 134 are sequentially disposed on the first side face S1 in a direction from the first end face E1 toward the second end face E2. The fifth to eighth external electrodes 135 to 138 are sequentially disposed on the second side face S2 in a direction from the second end face E2 toward the first end face E1. The multilayer chip capacitor according to the current embodiment is an eight-terminal capacitor having eight external electrodes. However, the present invention is not limited thereto.

Referring to FIGS. 1 through 4, in the capacitor body 110, a plurality of internal electrodes 121 to 128 (hereinafter, also referred to as first to eighth internal electrodes) are disposed on respective dielectric layers 110a in a stack direction. The plurality of internal electrodes 121 to 128 are disposed such that the internal electrodes of opposite polarity are alternated to face each other. Each of the internal electrodes 121 to 128 has one lead. Respective leads 121a to 128a of the first to eighth internal electrodes 121 to 128 extend to the first or second side face S1 or S2 of the capacitor body 110 and each are connected to corresponding one of the first to eight external electrodes 131 to 138. The first to eighth internal electrodes 121 to 128 are sequentially disposed in the stack direction to form one block. One or more blocks may be stacked in the stack direction in order to secure the desired capacity (see FIG. 4). That is, the internal electrodes may be stacked in the order of 121-122-123-124-125-126-127-128-121-122-123-124-....

Referring to FIGS. 2A through 2H, the lead 121a of the first internal electrode 121 is connected to the seventh external electrode 137, the lead 122a of the second internal electrode 122 is connected to the fourth external electrode 134, the lead 123a of the third internal electrode 123 is connected to the first external electrode 131, and the lead 124a of the fourth internal electrode 124 is connected to the sixth external electrode 136. The lead 125a of the fifth internal electrode 125 is connected to the third external electrode 133, the lead 126a of the sixth internal electrode 126 is connected to the eighth external electrode 138, the lead 127a of the seventh internal electrode 127 is connected to the fifth external electrode 135, and the lead 128a of the eighth internal electrode 128 is connected to the second external electrode 132.

In the lead disposition in the internal electrodes according to the current embodiment, leads of internal electrodes of opposite polarity adjacent vertically (i.e., in the stack direction or the z-axis direction) are spaced apart from each other at a horizontal distance longer than a pitch (see 'P' of FIG. 1) between adjacent external electrodes of opposite polarity disposed on the same side face. As shown in FIG. 3, because the pitch P between the adjacent external electrodes is equal to a horizontal pitch P between adjacent leads, the horizontal distance between the leads of the adjacent internal electrodes of opposite polarity is longer than the pitch P between the adjacent leads. Thus, the leads of the internal electrodes of opposite polarity adjacent vertically (e.g., the lead 121a and the lead 122a) are not adjacent to each other. Accordingly, a current path formed by the opposing internal electrodes of opposite polarity is elongated (see solid or dotted arrows of FIGS. 2A through 2H). Because of the elongated current path, equivalent series resistance (ESR) of a multilayer chip capacitor is increased.

During capacity operation, a current path in internal electrodes is affected by the lead disposition of adjacent internal electrodes of opposite polarity. The adjacent internal electrodes of opposite polarity cause a current to flow from a lead of positive polarity toward a lead of negative polarity. For example, as indicated by solid arrows in the first and second internal electrodes 121 and 122 of FIGS. 2A and 2B, the first internal electrode 121 of positive polarity and the second internal electrode 122 of negative polarity cause a current to flow from the lead 121a of the first internal electrode 121 toward the lead 122a of the second internal electrode 122. Also, a current flows from the lead 123a of the third internal electrode 123 of positive polarity toward the lead 122a of the second internal electrode 122 of negative polarity, as indicated by dotted arrows in the second internal electrode 122 and the third internal electrodes 123 of FIGS. 2B and 2C. In FIGS. 2A through 2H, solid arrows indicate a current path between the leads 123a and 124a of the third and fourth internal electrodes 123 and 124, a current path between the leads 125a and 126a of the fifth and sixth internal electrodes 125 and 126, a current path between the leads 127 and 128 of the seventh and eighth internal electrodes 127 and 128. In FIGS. 2A through 2H, dotted arrows indicate a current path between the leads 124a and 125a of the fourth and fifth internal electrodes 124 and 125, a current path between the leads 126a and 127a of the sixth and seventh internal electrodes 126 and 127, and a current path between the leads 128a and 121a of the eighth and first internal electrodes 128 and 121.

As can be seen from the current paths indicated by the arrows of FIGS. 2A through 2H, the current flows at the first to eight electrodes 121 to 128 are in directions opposite or perpendicular to each other with respect to at least one of a long side direction (i.e., an x-axis direction) and a short side direction (i.e., a y-axis direction) of the internal electrode. For example, the current flow indicated by the dotted arrow in the first internal electrode 121 is perpendicular to the current flow indicated by the dotted arrow in the second internal electrode 122. The current flow indicated by the solid arrow in the second internal electrode 122 is in an opposite direction to the current flow indicated by the solid arrow in the third internal electrode 123 with respect to the short side direction (i.e., the y-axis direction). That is, one has a current component in a positive y-direction, and the other one has a current component in a negative y-direction.

As mentioned above, the current flows in the internal electrodes 121 to 128 in opposite or perpendicular directions with respect to at least one of the long side direction and the short side direction. Thus, mutual inductance caused by the current flow in the same direction is partially canceled or does not occur. Accordingly, equivalent series inductance (ESL) that could increase due to the elongation of the current paths can be minimized.

FIGS. 5A through 5H are cross-sectional views of an internal electrode structure of a multilayer chip capacitor according to another exemplary embodiment of the present invention. The multilayer chip capacitor having internal electrode structures of FIGS. 5A through 5H has the same exterior as that of the multilayer chip capacitor of FIG. 1. According to the embodiment of FIGS. 5A through 5H, as compared to the embodiment of FIGS. 2A through 2H, a first internal electrode 121' further includes a lead 121b connected to the fifth external electrode 135 besides the lead 121a connected to the seventh external electrode 137. Other internal electrodes 122 to 128 have the same lead disposition and connection relation with the external electrodes as those of FIGS. 2A through 2H. Accordingly, as compared to the embodiment of FIGS. 2A through 2H, the first and second internal electrodes 121' and 122 additionally form a current path (indicated by a solid arrow) from the lead 121b of positive polarity toward the lead 122a of negative polarity. Also, the eighth and first internal electrodes 128 and 121' additionally form a current path (indicated by a dotted arrow) from the lead 121b of positive polarity toward the lead 128a of negative polarity.

Even in the embodiment of FIGS. 5A through 5H, leads of internal electrodes of opposite polarity which are adjacent to each other in the stack direction (e.g., the first internal electrode 121' and the second internal electrode 122) are spaced apart from each other at a horizontal distance (e.g., a horizontal distance between the leads 121a and 122a or between the leads 121b and 122a) longer than a pitch ('P' of FIG. 1) between adjacent external electrodes of opposite polarity disposed on the same side face, that is, a horizontal pitch ('P' of FIG. 3) between the leads. Accordingly, the leads of the internal electrodes of opposite polarity which are adjacent in the stack direction are not adjacent to each other, thereby increasing current paths in the internal electrodes and thus increasing the ESR of the multilayer chip capacitor. As indicated by dotted and solid arrows in FIGS. 5A through 5H, the current flows in the internal electrodes in directions opposite or perpendicular to each other with respect to at least one of a long side direction and a short side direction. Thus, the increase of ESL can be suppressed.

FIGS. 6A through 6H are cross-sectional views of an internal electrode structure of a multilayer chip capacitor according to still another exemplary embodiment of the present invention. The multilayer chip capacitor having the internal electrode structures of FIGS. 6A through 6H also has the same exterior as that of FIG. 1. According to the embodiment of FIGS. 6A through 6H, as compared to the embodiment of FIGS. 5A through 5H, a fourth internal electrode 124' further includes a lead 124b connected to the eighth external electrode 138, besides the lead 124a connected to the sixth external electrode 136. Other internal electrodes 121', 122, 123 and 125 to 128 have the same lead disposition and connection relation with the external electrodes as those of the embodiment of FIGS. 5A through 5H. As compared to the embodiment of FIGS. 5A through 5H, the third and fourth internal electrodes 123 and 124 additionally form a current path (indicated by a solid arrow) from the lead 123a of positive polarity toward the lead 124b of negative polarity. The fourth and fifth internal electrodes 124 and 125 additionally form a current path (indicated by a dotted arrow) from the lead 125a of positive polarity toward the lead 124b of negative polarity.

Also in the embodiment of FIGS. 6A through 6H, leads of internal electrodes of opposite polarity adjacent in the stack direction are spaced apart from each other at a horizontal distance which is longer than a pitch between adjacent external electrodes of opposite polarity disposed on the same side face. Accordingly, current paths in the internal electrodes are increased, and thus the ESR of the multilayer chip capacitor is increased. Also, as indicated by the dotted and solid arrows of FIGS. 6A through 6H, current flows in the internal electrodes in directions opposite or perpendicular to each other with respect to at least one of the long side direction and the short side direction. Accordingly, an increase of ESL can be suppressed.

FIGS. 7A through 7H are cross-sectional views of an internal electrode structure of a multilayer chip capacitor according to yet another exemplary embodiment of the present invention. FIGS. 8A through 8H are cross-sectional views of an internal electrode structure of a multilayer chip capacitor according to a further exemplary embodiment of the present invention. The multilayer chip capacitors of the embodiments of FIGS. 7 and 8 also have the same exterior as the multilayer chip capacitor of FIG. 1. Also in the embodiments of FIGS. 7 and 8, leads of internal electrodes of opposite polarity adjacent in the stack direction are spaced apart from each other at a horizontal direction that is longer than a pitch between adjacent external electrodes of opposite polarity disposed on the same side face. As indicated by arrows in FIGS. 7 and 8, the current flows in the internal electrodes in opposite or perpendicular directions with respect to at least one of the long side direction and the short side direction.

According to the embodiment of FIGS. 7A through 7H, as compared to the embodiment of FIGS. 6A through 6H, a fifth internal electrode 125' further includes a lead 125b connected to the first external electrode 131. Accordingly, as compared to the embodiment of FIGS. 6A through 6H, the fourth and fifth internal electrodes 124' and 125' additionally form a current path (indicated by a dotted arrow) from the lead 125b of positive polarity toward the lead 124a of negative polarity, and a current path (indicated by a dotted arrow) from the lead 125b of positive polarity toward the lead 124b of negative polarity. Also, the fifth and sixth internal electrodes 125' and 126 additionally form a current path (indicated by a solid arrow) from the lead 125b of positive polarity toward the lead 126a of negative polarity.

According to the embodiment of FIGS. 8A through 8H, as compared to the embodiment of FIGS. 7A through 7H, an eighth internal electrode 128' further includes a lead 128b connected to the fourth external electrode 134. Accordingly, as compared to the embodiment of FIGS. 7A through 7H, the seventh and eighth internal electrodes 127 and 128' additionally form a current path (indicated by a solid arrow) from the lead 127a of positive polarity toward the lead 128b of negative polarity. Also, the eighth and first internal electrodes 128' and 121' additionally form a current path (indicated by a dotted arrow) from the lead 121a of positive polarity toward the lead 128b of negative polarity, and a current path (indicated by a solid arrow) from the lead 121b of positive polarity toward the lead 128b of the negative polarity.

As described above, according to the embodiments of FIGS. 2 and 5 to 8, the number of leads of each internal electrode is limited to one or two, and the distance between the leads of opposite polarity forming the current path is longer than a pitch between the external electrodes. Accordingly, limitations of the ESR increase can be efficiently overcome. Also, since the current flows in the internal electrodes in opposite or perpendicular directions, an increase of ESL caused by the elongation of the current paths can be suppressed.

Figure 9:
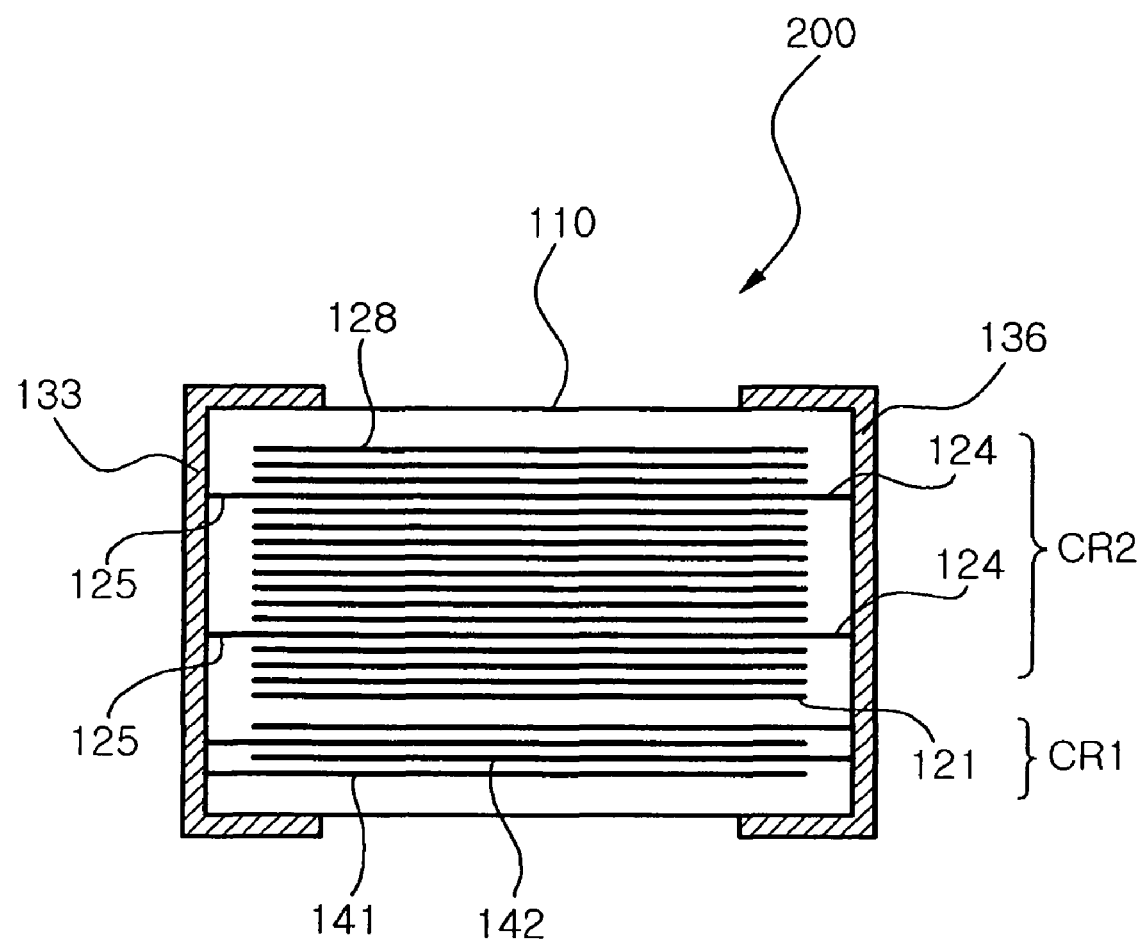
FIG. 9 is a sectional view of a multilayer chip capacitor according to a still further exemplary embodiment of the present invention.

FIG. 9 is a sectional view of a multilayer chip capacitor according to a still further exemplary embodiment of the present invention. The multilayer chip capacitor of FIG. 9 has the same exterior as the multilayer chip capacitor of FIG. 1. A multilayer chip capacitor 200 of FIG. 9 uses an additional internal electrode structure 141 and 142 together with the internal electrode structure 121 to 128 of the above embodiment.

As shown in FIG. 9, a capacitor body 110 includes a first capacitor part CR1 and a second capacitor part CR2 arranged in a stack direction. The second capacitor part CR2 includes the first to eighth internal electrodes 121 to 128. The first capacitor part CR1 has an additional internal electrode structure 141 and 142. In the first capacitor part CR1, internal electrodes 141 of positive polarity and internal electrodes 142 of negative polarity are alternately disposed to face each other. The internal electrodes 141 and 142 are separated by dielectric layers. Referring to FIG. 10, leads 141a to 141d and 142a to 142d of the additional internal electrodes 141 and 142 constituting the first capacitor part CR1 are disposed in the related art interdigitated arrangement.

The first capacitor part CR1 is disposed at a lower end in the capacitor body 110, and the second capacitor part CR2 is disposed on the first capacitor part CR1. When a capacitor is mounted on a circuit board, a bottom face or the lower end of the capacitor body 110 is located at a side close to amounting surface. A top face or an upper end of the capacitor body 110 corresponds to a side opposite to the bottom face or the lower end. Accordingly, the stack order of internal electrodes from an internal electrode closest to the mounting surface of the capacitor is 141-142-141-142- . . . -121-122-123-124-125-126-127-128- . . . .

As shown in FIG. 10, in the first capacitor part CR1, the additional internal electrode 141 includes four leads 141a, 141b, 141c and 141d, and the additional internal electrode 142 also includes four leads 142a, 142b, 142c and 142d. The leads 141a to 141d of the internal electrode 141 of positive polarity are arranged in interdigitated relation with the leads 142a to 142d of the internal electrode 142 of negative polarity. Each of the leads 141a to 141d and the leads 142a to 142d is connected to one of the external electrodes 131 to 138 having corresponding polarity.

In the first capacitor part CR1, the shortest horizontal distance between leads of internal electrodes 141 and 142 of opposite polarity adjacent vertically (e.g., a distance between the lead 141a of positive polarity and the lead 142a of negative polarity or between the lead 141b of positive polarity and the lead 142b of negative polarity) is equal to a pitch ('P' of FIG. 1 or 3) between adjacent external electrodes of opposite polarity. Particularly, the leads (e.g., the leads 141a and 142a) of the internal electrodes 141 and 142 of opposite polarity adjacent vertically are always adjacent to each other. Accordingly, the internal electrodes 141 and 142 of the first capacitor part CR1 form a very short current path between the adjacent leads (e.g., the leads 141a and 142a) of opposite polarity. Also, the interdigitated lead arrangement in the first capacitor part CR1 causes the current to flow in opposite directions, thereby canceling mutual inductance. Consequently, the ESL per layer of the first capacitor part CR1 may be lower than the ESL per layer of the second capacitor part CR2. The ESL per layer refers to ESL provided by one pair of adjacent internal electrodes of opposite polarity that face each other. Also, as described above, the ESR per layer of the second capacitor part CR2 becomes higher than the ESR per layer of the first capacitor part CR1 because of the elongated current path at the first internal electrodes 121 to 128.

The first capacitor part CR1 having lower ESL per layer is disposed at the lowermost part, and the second capacitor part CR2 having higher ESR per layer is disposed on the first capacitor part CR1. The current flowing in the capacitor at a high frequency concentrates at the lower internal electrodes 141 an 142 having lower ESL per layer, thereby reducing an actual current path formed by a current loop. Accordingly, the entire ESR can be greatly increased while the entire ESL is maintained at a low level.

Instead of using the above internal electrodes 121 to 128 in the second capacitor part CR2, the capacitor 200 having the first and second capacitor parts CR1 and CR2 may employ an internal electrode structure according to another embodiment. For example, the capacitor 200 may use any one of the internal electrode structures according to the exemplary embodiments of FIGS. 5A through 8 for the second capacitor part CR2. Even in this case, low ESL and high ESR can be achieved as described above with reference to FIGS. 9 and 10.

Figure 11:
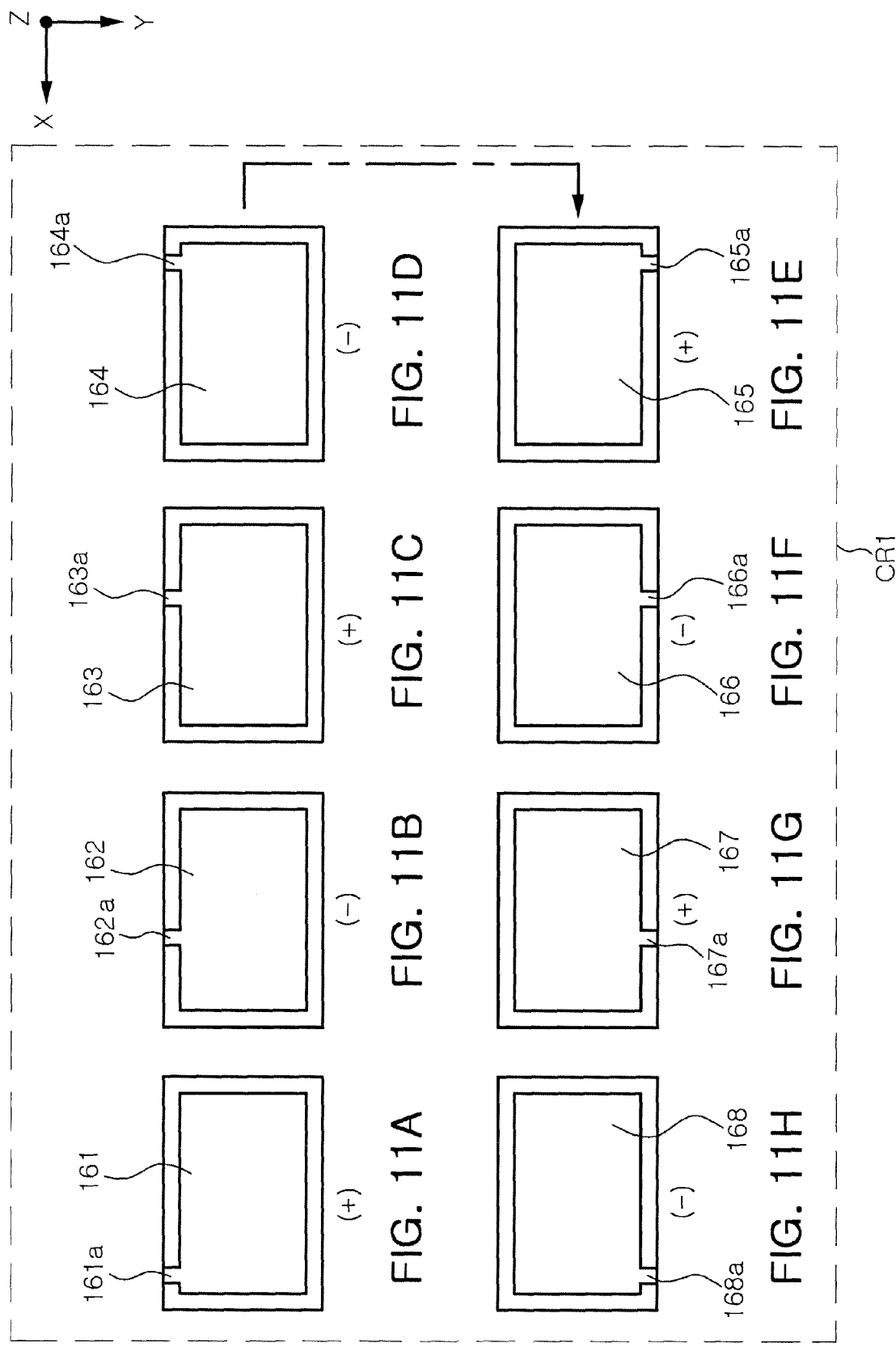
FIGS. 11A through 11H are cross-sectional views of an internal electrode structure of a first capacitor part of a multilayer chip capacitor according to a yet further exemplary embodiment of the present invention.
Figure 12:
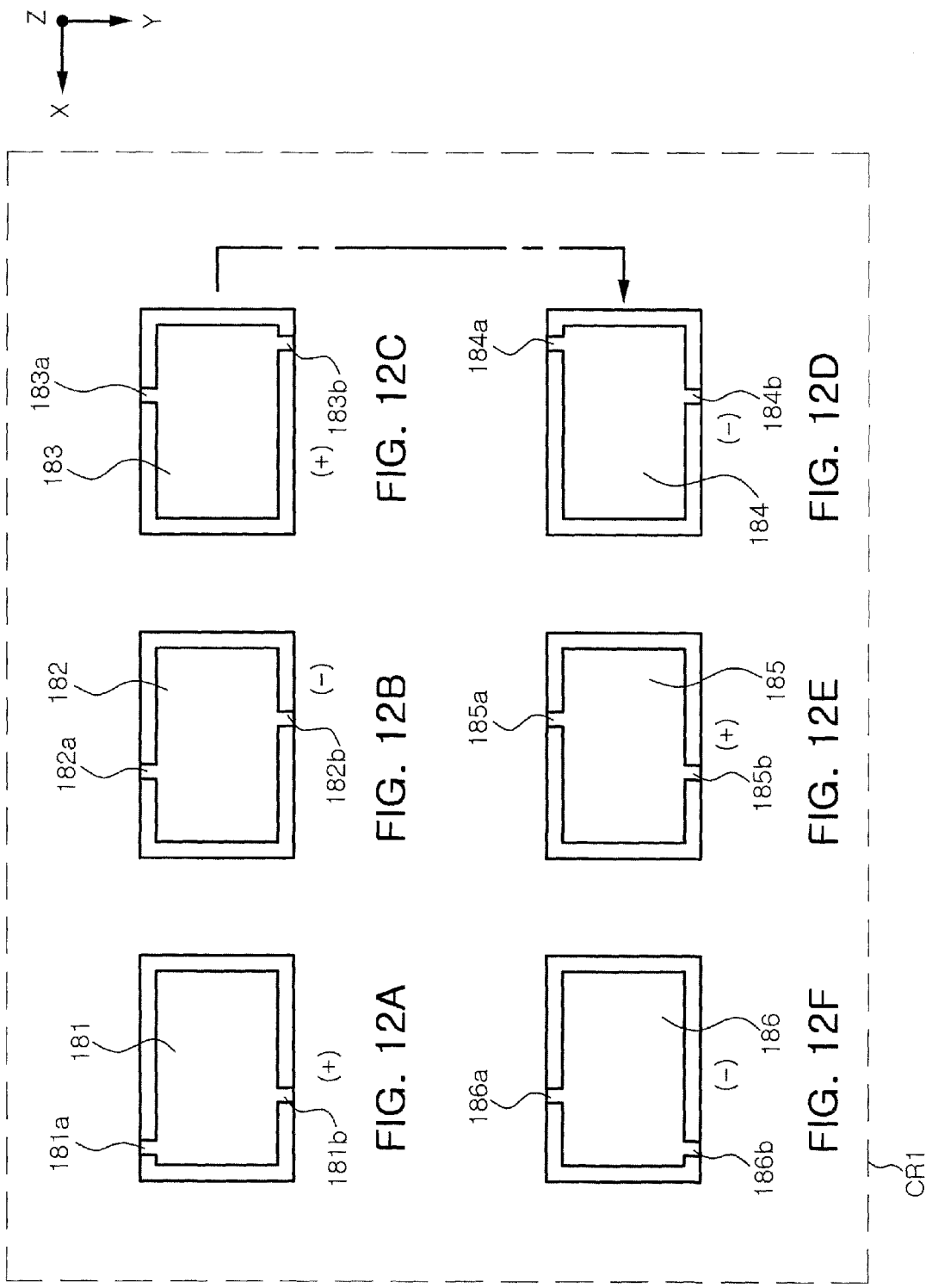
FIGS. 12A through 12F are cross-sectional views of an internal electrode structure of a first capacitor part of a multilayer chip capacitor according to another exemplary embodiment of the present invention.
Figure 13:
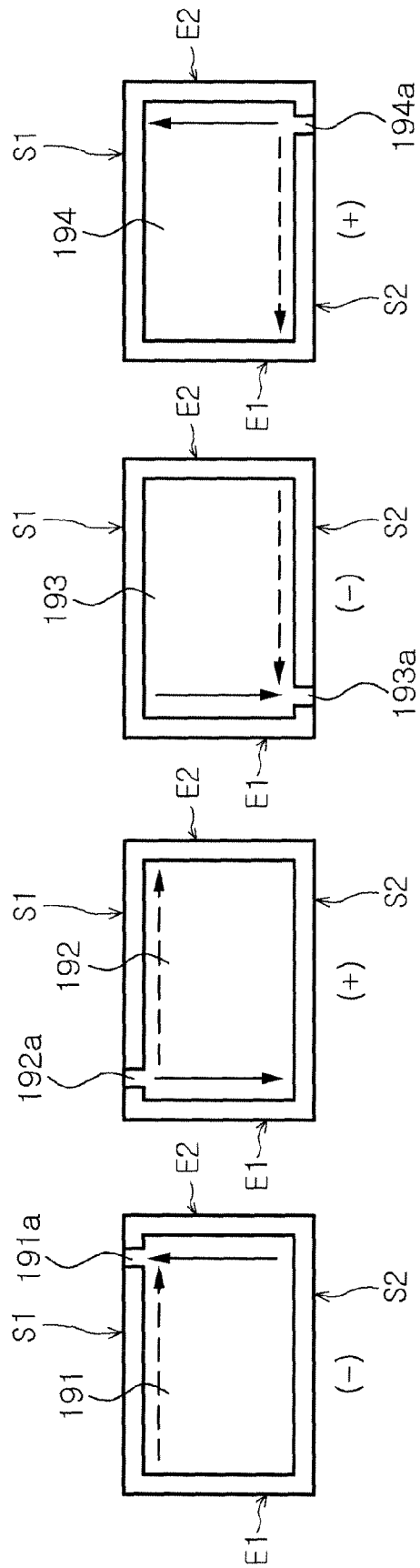
FIGS. 13A through 13D are cross-sectional views of an internal electrode structure of a second capacitor part of a multilayer chip capacitor according to still another exemplary embodiment of the present invention.

An internal electrode structure of the first capacitor part CR1 of the capacitor 200 is not limited to the internal electrode structure of the internal electrodes 141 and 142 having the interdigitated lead arrangement, and another internal electrode structure may be used in the first capacitor part CR1 of the capacitor 200. FIGS. 11 and 12 illustrate other examples of the internal electrode structure, which may be used in the first capacitor part CR1.

Referring to FIGS. 11A through 11H, a plurality of internal electrodes 161 to 168 are disposed to form a first capacitor part CR1. In the first capacitor part CR1 of FIGS. 11A through 11H, the internal electrodes 161, 163, 165 and 167 of positive polarity are alternated with the internal electrodes 162, 164, 166 and 168 of negative polarity to face each other. The internal electrodes 161 to 168 may be repetitively stacked. Each of the internal electrodes 161 to 168 has only one lead. Respective leads 161a to 168a of the internal electrodes 161 to 168 are connected to one of the first to eighth external electrodes 131 to 138 having corresponding polarity. Internal electrodes of opposite polarity that are vertically adjacent to each other and have leads extending to the same side face have the leads (e.g., the leads 161a and 162a) disposed adjacent to each other and respectively connected to adjacent external electrodes (e.g., the first and second external electrodes 131 and 132) on the same side face. Accordingly, the shortest horizontal distance between the adjacent leads of opposite polarity is equal to a pitch ('P' of FIG. 1) between the adjacent external electrodes. Particularly, the respective leads 161a to 168a of the internal electrodes 161 to 168 that are sequentially stacked are sequentially connected to the first to eighth external electrodes 131 to 138 along a circumference of the capacitor body. That is, as shown in FIGS. 11A through 11H, the leads 161a to 168a of the internal electrodes 161 to 168 are sequentially disposed clockwise along the circumference of the capacitor body.

Referring to FIGS. 12A through 12F, as another example of the first capacitor part CR1, internal electrodes 181 to 186 each having two leads may be used. The internal electrodes 181 to 186 maybe repetitively stacked. The internal electrodes 181, 183 and 185 of positive polarity and the internal electrodes 182, 184 and 186 have pairs of leads 181a and 181b, 183a and 183b, 185a and 185b, 182a and 182b, 184a and 184b, and 186a and 186b, respectively. The leads 181a to 186a extend to the first side face, and the leads 181b to 186b extend to the second side face.

According to the internal electrode structures of FIGS. 12A through 12F, when viewed from each of the first side face and the second side face, the leads are disposed in zigzag form along the stack direction. For example, the leads 181a to 186a extending to the first side face each are connected to the external electrodes in the order of 131-132-133-134-133-132-131-132-133-.... This zigzag lead disposition reduces the mutual inductance between leads (e.g., the leads 182a and 186a) of like polarity adjacent in the stack direction. Also, in each of the internal electrodes 181 to 186, a lead (e.g., the lead 181a) extending to the first side face is offset by a position of one adjacent external electrode in relation to a lead (e.g., the lead 181b) extending to the second side face. The zigzag lead disposition and the offset lead disposition allow all the internal electrodes of like polarity in the first capacitor part CR1 to be electrically connected together in the capacitor.

Low ESL and high ESR can be achieved, as described with reference to FIGS. 9 and 10, even when the internal electrode structures of FIGS. 11A through 11H or FIGS. 12A through 12F is used in the first capacitor part CR1 of the capacitor 200, instead of the internal electrode structure of FIG. 10. Also in the case where the internal electrode structures of FIGS. 11A through 11H or 12 is used in the first capacitor part CR1, any one internal electrode structure of those of FIGS. 5A through 8 may be used in the second capacitor part CR2, instead of the internal electrode structures of FIGS. 2A through 2H.

FIGS. 13A through 13D are cross-sectional views of another example of the internal electrode structure, which may be used in the second capacitor part CR2 of the multilayer chip capacitor 200. Referring to FIGS. 13A through 13D, first to fourth internal electrodes 191 to 194 are sequentially disposed in the stack direction to form the second capacitor part CR2. To secure the desired capacity, the internal electrodes 191 to 194 may be repetitively stacked.

As shown in FIGS. 13A through 13D, the internal electrodes 191 to 194 have leads 191a to 194a, respectively. The lead 191a of the first internal electrode 191 is connected to the external electrode 134 which is closest to a second end face E2 among the external electrodes 131 to 134 located on a first side face S1. The lead 192a of the second internal electrode 192 is connected to the external electrode 131 which is closest to a first end face E1 among the external electrodes 131 to 134 located on the first side face S1. The lead 193a of the third internal electrode 193 is connected to the external electrode 138 which is closest to the first end face E1 among the external electrodes 135 to 138 located on a second side face S2. The lead 194a of the fourth internal electrode 194 is connected to the external electrode 135 which is closest to the second end face E2 among the external electrodes 134 to 138 located on the second side face S2.

In the lead disposition described above, a horizontal distance between leads of internal electrodes of opposite polarity located vertically adjacent to each other is longer than a pitch ('P' of FIG. 3) between adjacent external electrodes of opposite polarity. Accordingly, the ESR of the second capacitor part CR2 can be greatly increased. Also, as indicated by arrows in FIGS. 13A through 13D, the current flows in the internal electrodes 191 to 194 in directions opposite or perpendicular to each other with respect to a long side direction (i.e., an x-axis direction) or a short side direction (i.e., a y-axis direction) of the internal electrodes 191 to 194.

Figure 14:
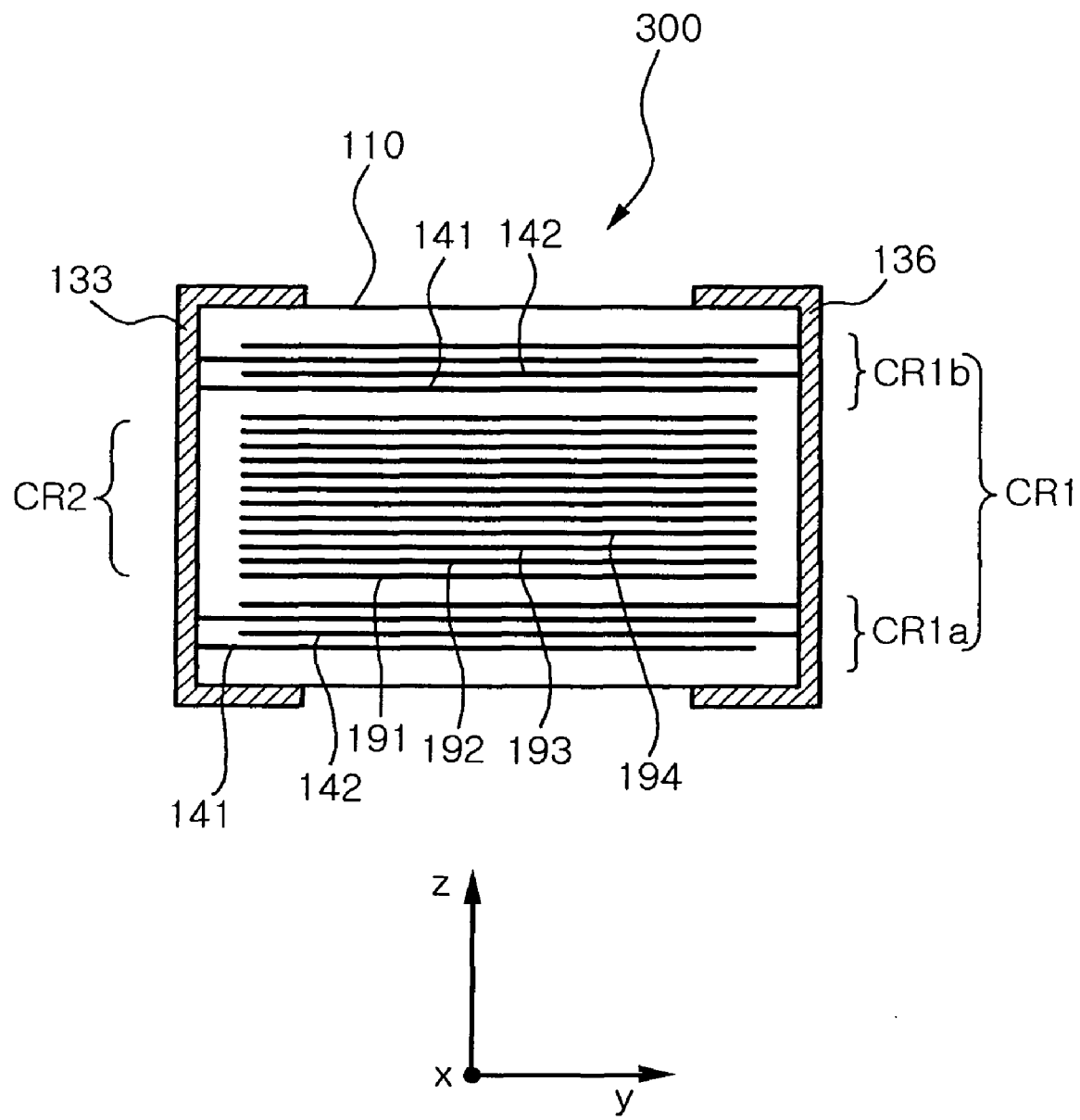
FIG. 14 is a cross-sectional view of a multilayer chip capacitor according to yet another exemplary embodiment of the present invention.

FIG. 14 is a sectional view of a multilayer chip capacitor according to another exemplary embodiment of the present invention. A multilayer chip capacitor 300 of FIG. 14 has the same exterior as the multilayer chip capacitor of FIG. 1. The sectional view of FIG. 14 may be compared with that of FIG. 4 or 9. According to the embodiment of FIG. 14, another first capacitor part is further stacked on the second capacitor part CR2.

As shown in FIG. 14, two first capacitor parts CR1 are disposed at an upper end portion and a lower end portion in the capacitor body 110. A second capacitor part CR2 is disposed between the upper first capacitor part CR1b and the lower first capacitor part CR1b. The internal electrodes 141 and 142 of FIG. 10 are alternately disposed in each of the upper and lower first capacitor parts CR1a and CR1b, and the internal electrodes 191 to 194 of FIGS. 13A through 13D are disposed in the second capacitor part CR2. The internal electrodes are disposed in the order of 141-142-141-142- ... 191-192-193-194-191-192- ... 141-142-141-142- ... from an internal electrode closest to a mounting surface.

Particularly, the upper and lower first capacitor parts CR1a and CR1b may be symmetrically disposed, so that upper and lower portions of the multilayer chip capacitor can be symmetrical to each other. Since the symmetry of the multilayer chip capacitor is secured, the multilayer chip capacitor can be mounted on the mounting surface without distinguishing between a top and a bottom of the multilayer chip capacitor. Also in the current embodiment, the greatly increased ESR can be realized while the ESL is maintained at a low level because the current flowing in the capacitor at a high frequency concentrates at the typical internal electrode structure 141 and 142.

In the embodiment of FIG. 14, the internal electrodes structure of FIG. 10 is used in each of the upper and lower first capacitor parts CR1a and CR1b, and the internal electrode structures of FIGS. 13A through 13D is used in the second capacitor part CR2. However, the present invention is not limited thereto. For example, the internal electrode structure of any one of FIGS. 10 to 12 may be used in each of the upper and lower first capacitor parts CR1a and CR1b. Also, the internal electrode structure of any one of FIGS. 2 and 5 to 8 may be used in the second capacitor part CR2.

According to the exemplary embodiments of the present invention, a multi-terminal multilayer chip capacitor that can achieve efficiently increased ESR while minimizing an increase of ESL can be realized.

While the present invention has been shown and described in connection with the exemplary embodiments, it will be apparent to those skilled in the art that modifications and variations can be made without departing from the spirit and scope of the invention as defined by the appended claims.

What is claimed is:

1. A multilayer chip capacitor comprising:
 a capacitor body comprising a stack of a plurality of dielectric layers and having first and second side faces facing each other and first and second end faces facing each other;
 a plurality of terminal electrodes each extending in a stack direction of the dielectric layers, the terminal electrodes of opposite polarity being alternated on each of the first and second side faces; and a plurality of internal electrodes each comprising one or two leads extending to an outer face of the capacitor body and respectively connected to the terminal electrodes, the internal electrodes of opposite polarity being alternated to face each other, with the dielectric layer located between each facing set of the internal electrodes, wherein a horizontal distance between leads of the internal electrodes of opposite polarity located adjacent to each other in the stack direction is longer than a pitch between the terminal electrodes of opposite polarity located adjacent to each other on the same side face of the capacitor body, wherein the one or two leads of one of the internal electrodes and the one or two leads of another of the internal electrodes having an opposite polarity located adjacent the one of the internal electrodes extend in opposite directions and are offset from one another.

2. The multilayer chip capacitor of claim 1, wherein a current flows in the internal electrodes in directions opposite or perpendicular to each other with respect to at least one of a long side direction and a short side direction of the internal electrode.

3. The multilayer chip capacitor of claim 1, wherein the multilayer chip capacitor is an 8-terminal capacitor, and the plurality of terminal electrodes comprise first to eighth terminal electrodes, the first to fourth terminal electrodes being sequentially disposed on the first side face from the first end face toward the second end face, and the fifth to eighth terminal electrodes being sequentially disposed on the second side face from the second end face toward the first end face.

4. The multilayer chip capacitor of claim 3, wherein the internal electrodes comprise first to eighth internal electrodes sequentially and consecutively disposed in the stack direction, the first to eight internal electrodes forming one or more blocks being stacked.

5. The multilayer chip capacitor of claim 4, wherein each of the first to eighth internal electrodes comprises the one or two leads extending to one of the first side face and the second side face.

6. The multilayer chip capacitor of claim 1, wherein the capacitor body comprises a first capacitor part and a second capacitor part arranged in the stack direction, the second capacitor part comprises the plurality of internal electrodes, and the first capacitor part comprises a plurality of additional internal electrodes of opposite polarity alternated in the capacitor body to face each other, with the dielectric layer located between each facing set of the additional internal electrodes, wherein in the first capacitor part, each of the plurality of additional internal electrodes comprises at least one lead extending to the first or second side face, and the shortest horizontal distance between respective leads extending to the same side face of the additional internal electrodes of opposite polarity located adjacent to each other in the stack direction is equal to a pitch between the terminal electrodes of opposite polarity located adjacent to each other on the same side face.

7. The multilayer chip capacitor of claim 6, wherein in the first capacitor part, the leads of the additional internal electrodes of opposite polarity located vertically adjacent to each other are adjacent to each other at all times.

8. The multilayer chip capacitor of claim 6, wherein the first capacitor part is disposed at a lower end in the capacitor body, and the second capacitor part is disposed on the first capacitor part.

9. The multilayer chip capacitor of claim 6, wherein the first capacitor part is disposed at each of upper and lower ends in the capacitor body, and the second capacitor part is disposed between the first capacitor part at the upper end and the first capacitor part at the lower end.

10. The multilayer chip capacitor of claim 9, wherein the first capacitor part at the upper end is symmetrical to the first capacitor part at the lower end, and the multilayer chip capacitor has upper and lower portions which are symmetrical to each other.

11. The multilayer chip capacitor of claim 6, wherein equivalent series resistance (ESR) per layer provided by one facing set of the internal electrodes in the second capacitor part is higher than ESR per layer provided by one facing set of the additional internal electrodes in the first capacitor part, and equivalent series inductance (ESL) per layer provided by one facing set of the additional internal electrodes in the first capacitor part is lower than ESL per layer provided by one facing set of the internal electrodes in the second capacitor part.

12. The multilayer chip capacitor of claim 6, wherein the plurality of internal electrodes in the second capacitor comprise ninth to twelfth internal electrodes sequentially and consecutively stacked, and each of the ninth to twelfth internal electrodes comprises one lead, wherein the one lead of the ninth internal electrode is connected to an terminal electrode closest to the second end face among the terminal electrodes disposed on the first side face, the one lead of the tenth internal electrode is connected to an terminal electrode closest to the first end face among the terminal electrodes disposed on the first side face, the one lead of the eleventh internal electrode is connected to an terminal electrode closest to the first end face among the terminal electrodes disposed on the second side face, and the one lead of the twelfth internal electrode is connected to an terminal electrode closest to the second end face among the terminal electrodes disposed on the second side face.

13. The multilayer chip capacitor of claim 6, wherein the plurality of additional internal electrodes in the first capacitor part comprise additional internal electrodes of first polarity and additional internal electrodes of second polarity alternated to face each other, and each of the additional internal electrodes comprises at least two leads, wherein leads of the additional internal electrode of first polarity are disposed adjacent to leads of the additional internal electrode of second polarity in an interdigitated arrangement, the leads being connected to the terminal electrodes of corresponding polarity.

14. The multilayer chip capacitor of claim 6, wherein the plurality of additional internal electrodes in the first capacitor part comprise additional internal electrodes of first polarity and additional internal electrodes of second polarity alternated with each other to face each other, and each of the additional internal electrodes comprises only one lead connected to the terminal electrode, wherein in the first capacitor part, respective leads extending to the same side face of the additional internal electrodes located adjacent to each other in the stack direction are connected to the terminal electrodes located adjacent to each other on the same side face.

15. The multilayer chip capacitor of claim 6, wherein the plurality of additional internal electrodes in the first capacitor part comprise additional internal electrodes of first polarity and additional internal electrodes of second polarity alternated with each other to face each other, and each of the additional internal electrodes comprises two leads respectively extending to the first side face and the second side face and connected to the terminal electrodes, wherein in each of the additional internal electrodes in the first capacitor part, the lead extending to the first side face is offset by one terminal electrode position in relation to the lead extending to the second side face, and the leads of the plurality of additional internal electrodes in the first capacitor part are disposed in zigzag form along the stack direction from the view of each of the first and second side faces.

16. A multilayer chip capacitor comprising:
a capacitor body comprising a stack of a plurality of dielectric layers and having first and second side faces facing each other and first and second end faces facing each other;
a plurality of terminal electrodes each extending in a stack direction of the dielectric layers, the terminal electrodes of opposite polarity being alternated on each of the first and second side faces; and
a plurality of internal electrodes each comprising one or two leads extending to an outer face of the capacitor body and respectively connected to the terminal electrodes, the internal electrodes of opposite polarity being alternated to face each other, with the dielectric layer located between each facing set of the internal electrodes, wherein:
a horizontal distance between leads of the internal electrodes of opposite polarity located adjacent each other in the stack direction is longer than a pitch between the terminal electrodes of opposite polarity located adjacent to each other on the same side face of the capacitor body,
the multilayer chip capacitor is an 8-terminal capacitor, and the plurality of terminal electrodes comprise first to eighth terminal electrodes, the first to fourth terminal electrodes being sequentially disposed on the first side face from the first end face toward the second end face, and the fifth to eighth terminal electrodes being sequentially disposed on the second side lace from the second end face toward the first end face, the internal electrodes comprise first to eighth internal electrodes sequentially and consecutively disposed in the stack direction, the first to eight internal electrodes forming one or more blocks being stacked, each of the first to eighth internal electrodes comprises the one or two leads extending to one of the first side face and the second side face, one of the one or two leads of the first internal electrode is directly connected to the seventh terminal electrode, one of the one or two leads of the second internal electrode is directly connected to the fourth terminal electrode, one of the one or two leads of the third internal electrode is directly connected to the first terminal electrode, one of the one or two leads of the fourth internal electrode is directly connected to the sixth terminal electrode, one of the one or two leads of the fifth internal electrode is directly connected to the third terminal electrode, one of the one or two leads of the sixth internal electrode is directly connected to the eighth terminal electrode, one of the one or two leads of the seventh internal electrode is directly connected to the fifth terminal electrode, and one of the one or two leads of the eighth internal electrode is directly connected to the second terminal electrode.

17. The multilayer chip capacitor of claim 16, wherein the first internal electrode further comprises a lead directly connected to the fifth terminal electrode.

18. The multilayer chip capacitor of claim 17, wherein the fourth internal electrode further comprises a lead directly connected to the eighth terminal electrode.

19. The multilayer chip capacitor of claim 18, wherein the fifth internal electrode further comprises a lead directly connected to the first terminal electrode.

20. The multilayer chip capacitor of claim 19, wherein the eighth internal electrode further comprises a lead directly connected to the fourth terminal electrode.

* * * * *